(12) United States Patent
Kong et al.

(10) Patent No.: US 12,724,547 B2
(45) Date of Patent: Sep. 1, 2026

(54) DATA STORING METHOD, STORAGE DEVICE, AND COMPUTER-READABLE STORAGE DEVICE

(71) Applicant: Shanghai Longsys Digital Technology Co., Limited, Shanghai (CN)

(72) Inventors: Weizhen Kong, Shanghai (CN); Xinghui Duan, Shanghai (CN)

(73) Assignee: Shanghai Longsys Digital Technology Co., Limited, Shanghai (CN)

( * ) Notice: Subject to any disclaimer, the term of this patent is extended or adjusted under 35 U.S.C. 154(b) by 0 days.

(21) Appl. No.: 18/950,206

(22) Filed: Nov. 18, 2024

(65) Prior Publication Data

US 2025/0077094 A1 Mar. 6, 2025

Related U.S. Application Data

(63) Continuation of application No. PCT/CN2022/093630, filed on May 18, 2022.

(51) Int. Cl.
*G06F 12/00* (2006.01)
*G06F 3/06* (2006.01)

(52) U.S. Cl.
CPC .......... *G06F 3/0619* (2013.01); *G06F 3/0656* (2013.01); *G06F 3/0659* (2013.01); *G06F 3/0679* (2013.01)

(58) Field of Classification Search
None
See application file for complete search history.

(56) References Cited

U.S. PATENT DOCUMENTS 9,396,796 B2 * 7/2016 Lee ........................ G11C 16/06
2015/0193302 A1 7/2015 Hyun et al.
2017/0255514 A1 9/2017 Honma
2019/0096449 A1 3/2019 Kim
2019/0227751 A1 7/2019 Khakifirooz et al.
2020/0194072 A1 * 6/2020 Oh ........................ G11C 16/10
2020/0286551 A1 9/2020 Sheperek et al.

FOREIGN PATENT DOCUMENTS

CN 102754165 A 10/2012
CN 106158040 A 11/2016
CN 109426620 A 3/2019
(Continued)

OTHER PUBLICATIONS

Korean First Request for the Submission of an Opinion , Korean Application No. 10-2024-7038696, mailed May 28, 2025 (9 pages).
(Continued)

*Primary Examiner* — Daniel D Tsui

(57) ABSTRACT

A method of storing data includes: writing data in a first buffer area and writing data in a second buffer area of a page buffer; writing data in a third buffer area of the page buffer, wherein the data written in the third buffer area are obtained by taking a computation resource of the page buffer to perform a logical operation on the data in the first buffer area and the data in the second buffer area; first data information is determined based on the data in the first buffer area, the data in the second buffer area, and the data in the third buffer area; and writing the first data information cached in the page buffer to a memory unit.

20 Claims, 7 Drawing Sheets

(56) References Cited

FOREIGN PATENT DOCUMENTS

| | | | |
|---|---|---|---|
| CN | 109753480 | A | 5/2019 |
| CN | 110597555 | A | 12/2019 |
| CN | 111402947 | A | 7/2020 |
| CN | 111625188 | A | 9/2020 |
| CN | 111965406 | A | 11/2020 |
| CN | 112035055 | A | 12/2020 |
| CN | 112885386 | A | 6/2021 |
| CN | 113821158 | A | 12/2021 |
| CN | 113936725 | A | 1/2022 |
| CN | 114141292 | A | 3/2022 |
| CN | 114356221 | A | 4/2022 |
| JP | 2019057352 | | 4/2019 |
| KR | 20200071955 | A | 6/2020 |
| WO | 2022040949 | A1 | 3/2022 |

OTHER PUBLICATIONS

Electronic Journal, vol. 11, Issue 46; Nov. 15, 2018 ; Chen Ke et al. , Research on C/F Read Algorithm Based on a NAND Flash Page Buffer Design; Abstract of the paper, pp. 1-7, Figure 6; 1-18; Publication dated Nov. 2018 (22 pages).

Chinese First Office Action,Chinese Application No. 202210551097.X, mailed May 31, 2023 (17 pages).

Chinese Second Office Action,Chinese Application No. 202210551097.X, mailed Sep. 1, 2023 (11 pages).

Chinese Notification to Grant Patent Right for Invention, Chinese Application No. 202210551097.X, mailed Sep. 16, 2023 (5 pages).

International Search Report,International Application No. PCT/CN2022/093630, International mailed Jan. 20, 2023 (14 pages).

Japanese First Notice of Reasons for Refusal,Japanese Patent Application No. 2024-568136, mailed Sep. 24, 2025 (6 pages).

Korean Second Request for the Submission of an Opinion, Korean Application No. 10-2024-7038696, mailed May 27, 2026(11 pages).

* cited by examiner

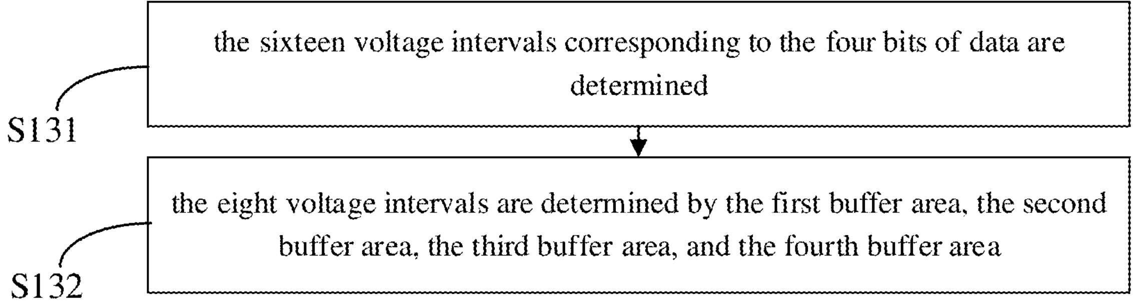
FIG. 16
FIG. 17
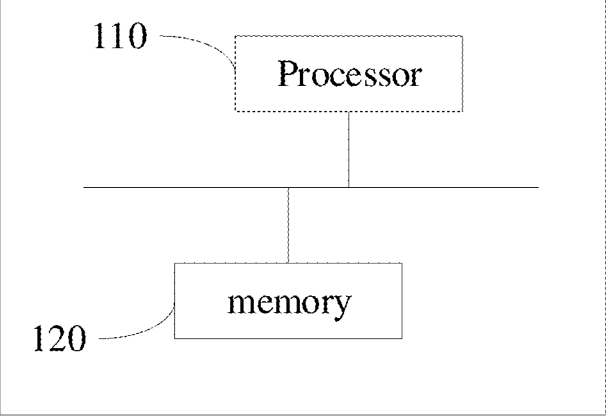
FIG. 18
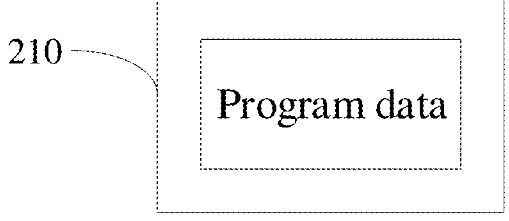
FIG. 19

DATA STORING METHOD, STORAGE DEVICE, AND COMPUTER-READABLE STORAGE DEVICE

CROSS REFERENCE TO RELATED APPLICATIONS

The present application is a continuation application of the international patent application No. PCT/CN2022/093630, filed on May 18, 2022, contents of which are incorporated herein by its entireties.

TECHNICAL FIELD

The present disclosure relates to the field of data storing, and in particular to a data storing method, a storage device, and a computer-readable storage device.

BACKGROUND

Storage devices are used increasingly widely, and storing technologies of the storage devices are also constantly progressing and developing. Taking TLC/QLC memories, which are widely used, as an example, for a TLC memory, data information of three bits can be stored in one memory cell; and for a QLC memory, data information of four bits can be stored in one memory cell. In order to distinguish various types of data information from each other in one memory cell, corresponding voltage intervals need to be formed. The TLC memory needs to be divided into eight voltage intervals, and the QLC memory needs to be divided into sixteen voltage intervals. However, since a voltage range in one memory cell is limited, when an increased number of voltage intervals are to be formed, a spacing between two voltage intervals is reduced. A reduced smaller spacing means that, when voltage data is shifted to a left or to a right due to any factors, the voltage data may exceed a limit voltage value of the voltage interval. In this case, reading according to the limit voltage value of the original voltage interval may result in data errors, reliability of data storage is reduced.

SUMMARY OF THE DISCLOSURE

The present application disclose a data storing method, a storage device, and a computer-readable storage device, such that reliability of stored data is improved.

In a first aspect, a method of storing data includes: writing first data in a first buffer area and writing second data in a second buffer area of a page buffer; writing third data in a third buffer area of the page buffer, wherein the third data written in the third buffer area are obtained by taking a computation resource of the page buffer to perform a logical operation on the first data in the first buffer area and the second data in the second buffer area; first data information is determined based on the first data in the first buffer area, the second data in the second buffer area, and the third data in the third buffer area; and writing the first data information cached in the page buffer to a memory unit.

In a second aspect, a storage device includes: a memory and a processor. The memory is configured to store program data, the program data being capable of being executed by the processor to perform the method in the first aspect.

In a third aspect, a computer-readable storage device is provided. Program data are stored therein, the program data being capable of being executed by a processor to perform the method in the first aspect.

In the present disclosure, based on determining the data in the first buffer area and the second buffer area, instead of determining the data in the third buffer area based on the threshold voltage value, the data in the third buffer area are determined by performing the logical operations on the data in the first buffer area and the data in the second buffer area. The cached data has two states, namely 0 or 1, and one bit of data information is stored in one buffer area. Therefore, when the data in the first buffer area, the data in the second buffer area, and the data in the third buffer area are determined based on the method in the art, eight types of data information are obtained. In the present disclosure, the data in the third buffer area are obtained by performing the logical operations on the data in the first buffer area and in the second buffer area, and therefore, the data in the third buffer area correspond to the four states of data in the first the buffer area and the second buffer area. In this way, the data information finally obtained based on the data in the first buffer area, the data in the second buffer area, and the data in the third buffer area has only four states instead of eight states in the art. Since the states of the data information are reduced, within the same maximum voltage interval, a larger voltage interval is divided for each of the four states of data, tolerance for data voltage shifting is improved, and reliability of the stored data is improved. Further, the logical operations can be achieved by applying logical operation functions in the page buffer, and the computation resource of an upper layer is not needed, the computation power of the system is saved.

BRIEF DESCRIPTION OF THE DRAWINGS

In order to more clearly illustrate the technical solutions in the embodiments of the present disclosure, the accompanying drawings for describing the embodiments will be introduced briefly in the following. Obviously, the accompanying drawings in the following description show only some of the embodiments of the present disclosure, and any ordinary skilled person in the art may obtain other attachments based on the accompanying drawings without any creative work.

FIG. 16 is a flow chart of a data storing method according to a thirteenth embodiment of the present disclosure.

FIG. 17 is a flow chart of a data storing method according to a fourteenth embodiment of the present disclosure.

FIG. 18 is a structural schematic view of a storage device according to some embodiments of the present disclosure.

FIG. 19 is a structural schematic view of a computer-readable storage device according to some embodiments of the present disclosure.

DETAILED DESCRIPTION

Technical solutions in embodiments of the present disclosure will be described below by referring to the accompanying drawings of the embodiments of the present disclosure. Apparently, the described embodiments are a part of but not all of the embodiments of the present disclosure. All other embodiments, which are obtained by any ordinary skilled person in the art based on the embodiments in the present disclosure without making creative work, shall fall within the scope of the present disclosure.

The terms "first", "second", and so on in the present disclosure are used to distinguish between different objects and are not used to describe a particular order. In addition, the terms "comprise", "have", and any variations thereof, are intended to cover non-exclusive inclusion. For example, a process, a method, a system, a product or an apparatus comprising a series of steps or units is not limited to the listed steps or units, but may further comprise steps or units that are not listed or comprise steps or units that are inherently included in the process, the method, the system, the product or the apparatus.

Reference to "embodiments" herein implies that particular features, structures, or characteristics described in embodiments may be included in at least one embodiment of the present disclosure. Presence of the term at various sections in the specification does not necessarily refer to one embodiment nor a separate or alternative embodiment that is mutually exclusive of other embodiments. It is understood by any ordinary skilled person in the art that, both explicitly and implicitly, the embodiments described herein may be combined with other embodiments.

Before describing technical embodiments of the present disclosure, the related art will be described briefly in the following.

Figure 1:
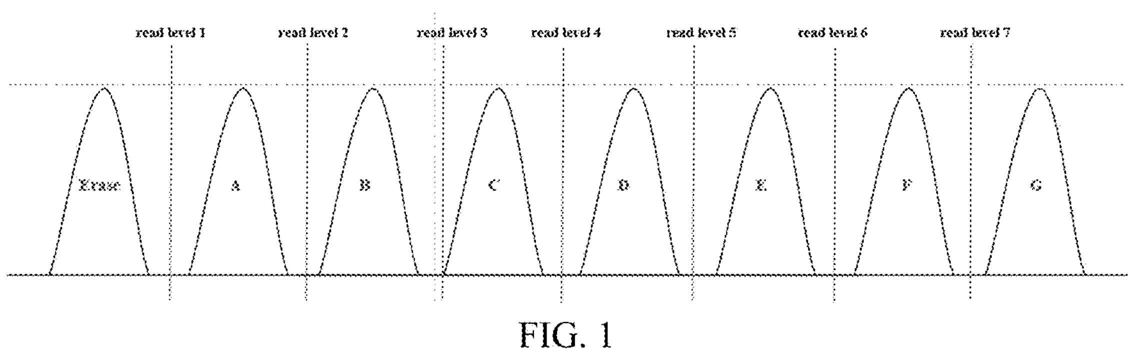
FIG. 1 is a schematic view of a TLC NAND FLASH memory writing read voltages according to some embodiments of the present disclosure.

As shown in FIG. 1, FIG. 1 shows a schematic view of a TLC NAND FLASH memory writing read voltages.

In the art, the TLC NAND FLASH memory and a QLC NAND FLASH memory are frequently used in practice. For the TLC NAND FLASH memory, 3 bits of information are stored in one memory cell; and for the QLC NAND FLASH memory, 4 bits of information are stored in one memory cell. For a MLC memory, 2 bits of information are stored in one memory cell. Therefore, production costs of the TLC NAND FLASH memory and the QLC NAND FLASH memory are lower than that of MLC memory. However, the TLC NAND FLASH memory, the QLC NAND FLASH memory, and the MLC memory have a same maximum voltage interval of a memory cell. Within the same maximum voltage interval, storing more information means that the voltage interval needs to be divided into a larger number of sub-intervals, such that stored voltages can be recognized, based on interval thresholds, for reading data. For the TLC memory, as shown in FIG. 1, one memory cell stores 3 bit of information. Therefore, 8 voltage states are present, and 8 intervals are needed and correspond to different read levels.

Data stored in the TLC memory has 3 bits. During storing, data of each of the 3 bits is stored into a respective page buffer. After the data of all the 3 bits are stored to a buffer, the data are written to a storage particle. In FIG. 1, a writing mode of the memory unit is a 2-3-2 mode. Firstly, a read level 1 and a read level 5 are used to write the data, and the written data are stored to a lower page buffer, a data state of the written data from left to right is 101, and data of a lowest bit is written. Subsequently, a read level 2, a read level 4, and a read level 6 are used to write the data, and the written data are stored to a middle page buffer, a data state of the written data from left to right is 1010, and data of a middle bit is written. Lastly, a read level 3 and a read level 7 are used to write the data, and the written data are stored to an upper page buffer, and data of a highest bit is written. Sequentially, obtained data are 111, 110, 100, 000, 010, 011, 001, 101. Finally, all the data are stored to the storage particle together.

Figure 2:
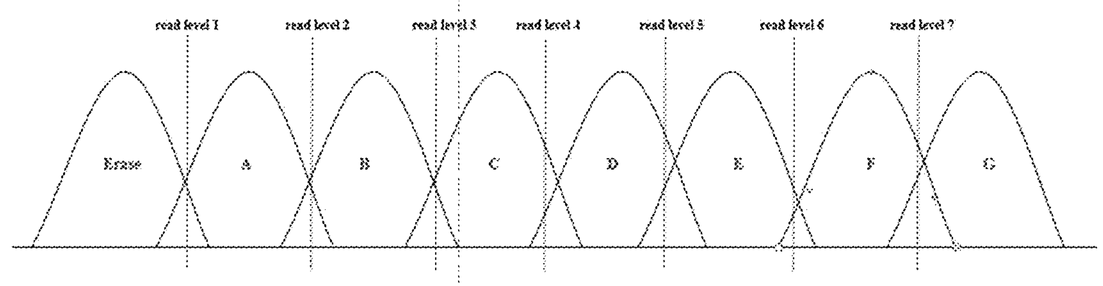
FIG. 2 is a schematic view of voltages stored in TLC memory units being shifted to a left or to a right according to some embodiments of the present disclosure.

During writing the data, due to various interference factors, voltage distribution of each voltage state may be shifted to the left and right and widened, such that respective read levels cannot well differentiate the eight voltage states properly when reading. As shown in FIG. 2, FIG. 2 shows a schematic view of the voltages stored in the TLC memory units being shifted to the left and right. If a certain number of error bits are reached, the data may fail to be read, resulting in data loss. Even if the voltages are shifted, due to the interference factors, to the left and right, when a voltage sub-interval for storing the data is larger, it is more easily to recognize the stored data when being read according to the read levels, and it is less likely to have errors in the data, and the reliability of storing the data is higher.

In some application scenarios, requirements about data reliability are significantly high, whereas requirements about a storage capacity are less strict. Reliability of the TLC/QLC memory does not meet actual demands of a user. Therefore, the present disclosure provides following embodiments to improve the data reliability of the TLC/QLC memory to meet the use requirements.

Figure 3:
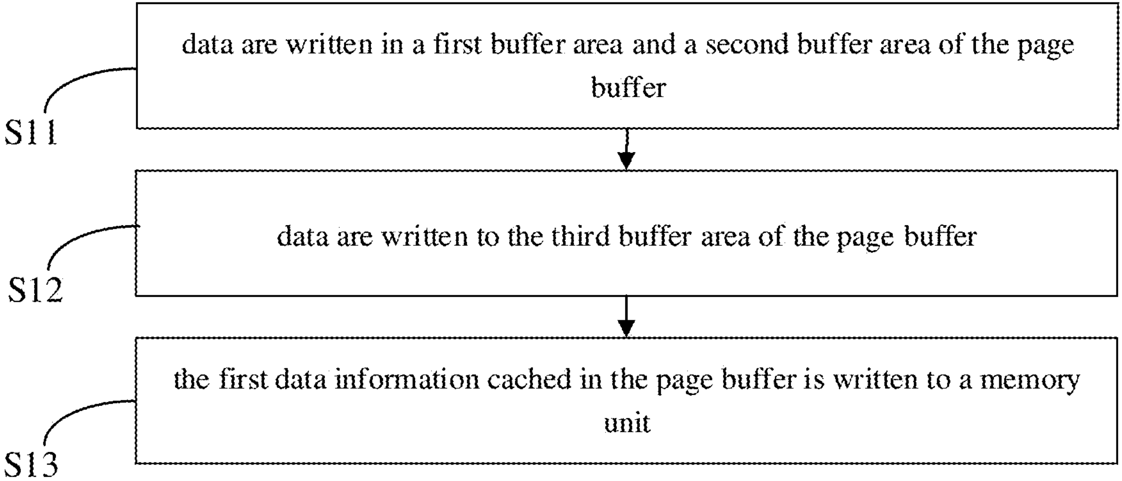
FIG. 3 is a flow chart of a data storing method according to a first embodiment of the present disclosure.

As shown in FIG. 3, FIG. 3 is a flow chart of a data storing method according to a first embodiment of the present disclosure.

In an operation S11, data are written in a first buffer area and a second buffer area of the page buffer.

In accordance with an original storage writing process, data of first two bits are written to the cache area according to read levels for writing. Taking the 2-3-2 mode of the TLC memory described above as an example, the read level 1 and the read level 5 are used for writing data, and the written data are stored in the lower page buffer. Subsequently, the read level 2, the read level 4, and the read level 6 are used for writing data, and the written data are stored in the middle page buffer. In this case, the first buffer area is the lower page buffer, and the second buffer area is the middle page buffer, which are illustrated as examples only. In practice, the first buffer area and the second buffer area can be any two buffer areas. In a subsequent process, a third buffer area is a buffer area different from the first buffer area and the second buffer area.

In an operation S12, data are written to the third buffer area of the page buffer.

After the data are finished being written in the first buffer area and the second buffer area, instead of writing the data in the third buffer area according to the read levels in the original process, the data written in the third buffer area are obtained by taking computational resources of the page buffer to perform a logical operation on the data in the first buffer area and the data in the second buffer area. For example, the logical operation may be a same operation, an "and" operation, or a "NOR" operation, a "NAND" operation, an "XNOR" operation, an "XOR" operation, and so on. Furthermore, a first data information is determined from the data in the first buffer area, the data in the second buffer area, and the data in the third buffer area. The first data information is determined based on the data written in the first buffer area, the data written in the second buffer area, and the data written in the third buffer area, where the first buffer area, the second buffer area, and the third buffer area corresponding to a same voltage interval.

In an operation S13, the first data information cached in the page buffer is written to a memory unit.

After writing the data in the buffer is completed, the finally obtained data information is written to the memory unit to complete data storage.

The logical operation in the present embodiment can be achieved by relying on a logical operation capability of the page buffer itself, without requirement any computational resource of a main control, and therefore, a computation power of a system is saved.

According to the present embodiment, after determining the data in the first buffer area and the data in the second buffer area, instead of using threshold voltage values of a voltage interval to further determine the data in the third buffer area, the data in the third buffer area are obtained by performing the logical operation on the data in the first buffer area and the data in the second buffer area. The data in the buffer has 0 or 1, and each buffer area stores one bit of cached data. Therefore, when applying the technical solution in the art to determine the data in the first buffer area, the data in the second buffer area, and the data in the third buffer area based on the threshold voltage values of the voltage interval, eight data informations are obtained. By contrast, in the present disclosure, the data in the third buffer area is determined by performing the logical operation on the data in the first buffer area and the data in the second buffer area, and that is, the data in the third buffer area corresponds to four states of the data in the first buffer area and the data in the second buffer area. In this way, the data information, which is obtained based on the data in the first buffer area, the data in the second buffer area, and the data in the third buffer area, has only four states instead of eight states in the art. Since the number of states of the data information is reduced, for the same maximum voltage interval, each of the four states of data information corresponds to a larger voltage interval, such that tolerance for data voltage shifting is improved, and reliability of the stored data is improved.

Figure 4:
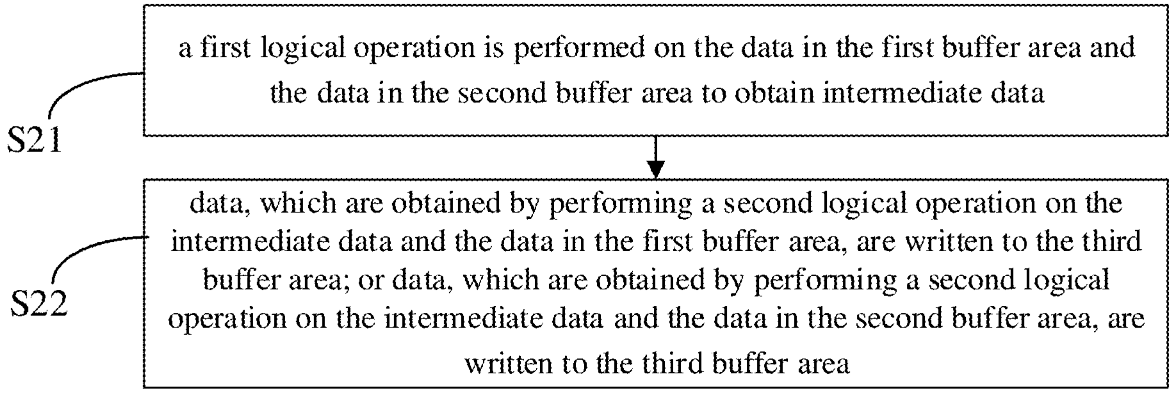
FIG. 4 is a flow chart of a data storing method according to a second embodiment of the present disclosure.

As shown in FIG. 4, FIG. 4 is a flow chart of the data storing method according to a second embodiment of the present disclosure. The method in FIG. 4 is an extension of the operation S12, and the operation S12 further includes following operations.

In an operation S21, a first logical operation is performed on the data in the first buffer area and the data in the second buffer area to obtain intermediate data.

The first logical operation is performed on the data in the first buffer area and the data in the second buffer area, and the first logical operation may be the "XNOR" operation.

In an operation S22, data, which are obtained by performing a second logical operation on the intermediate data and the data in the first buffer area, are written to the third buffer area; or data, which are obtained by performing a second logical operation on the intermediate data and the data in the second buffer area, are written to the third buffer area.

The data, which are obtained by performing the second logical operation on the intermediate data and the data in the first buffer area, are written to the third buffer area, and the second logical operation may be an "OR" operation. Alternatively, the data, which are obtained by performing the second logical operation on the intermediate data and the data in the second buffer area, are written to the third buffer area.

Taking the 2-3-2 mode of the TLC memory as an example, the data written to the first buffer area is 10000111, the data written to the second buffer area is 11001100, the "XNOR" operation is performed on the data 10000111 and the data 11001100 to obtain data 10110100. The "OR" operation is performed on the data in the first buffer area and the obtained data 10110100 to obtain the data 10110111 to be stored in the third buffer area. Voltages of the finally stored data has four states, which are 111, 001, 010, 101 of the original eight states. Every two adjacent voltage intervals of the four states have a large spacing therebetween. Therefore, new data reading voltages can be set for the four states. The new data reading voltages can distinguish the four voltage states from each other, such that the spacing between any two of the new four voltage states is greater than that in the related art. Therefore, the new data reading voltages have improved tolerance for the voltage shifting, reliability of the data is improved, and a probability of data errors is reduced.

Similarly, when the "OR" operation is performed on the intermediate data and the data in the second buffer area, data 11111100 are obtained and are stored in the third buffer area. In this way, data voltages stored in the third buffer area have four states, which are 111, 011, 001, and 100 of the original eight states. A voltage interval of the data 100 is located far away from the other three voltage intervals, and the other three intervals are still located close to each other. Therefore, after setting the new data reading voltages, the voltage interval of the data 100 has a larger spacing to other voltage intervals and has an improved tolerance to voltage shifting, data reliability for the voltage interval of the data 100 is improved, and a probability of data errors is reduced. The other three voltage intervals may not differ from each other greatly, and data reliability of the other three voltage intervals may not change significantly.

Therefore, for processes of the logical operation, voltage intervals of four voltage states need to be evenly distributed in the entire maximum voltage interval. In this way, the voltage interval of each voltage state can have an increased spacing to adjacent voltage interval, rather than only certain one voltage interval has a significantly increased spacing. In this way, reliability of all stored data, instead of data in certain one voltage interval, can be improved.

Figure 5:
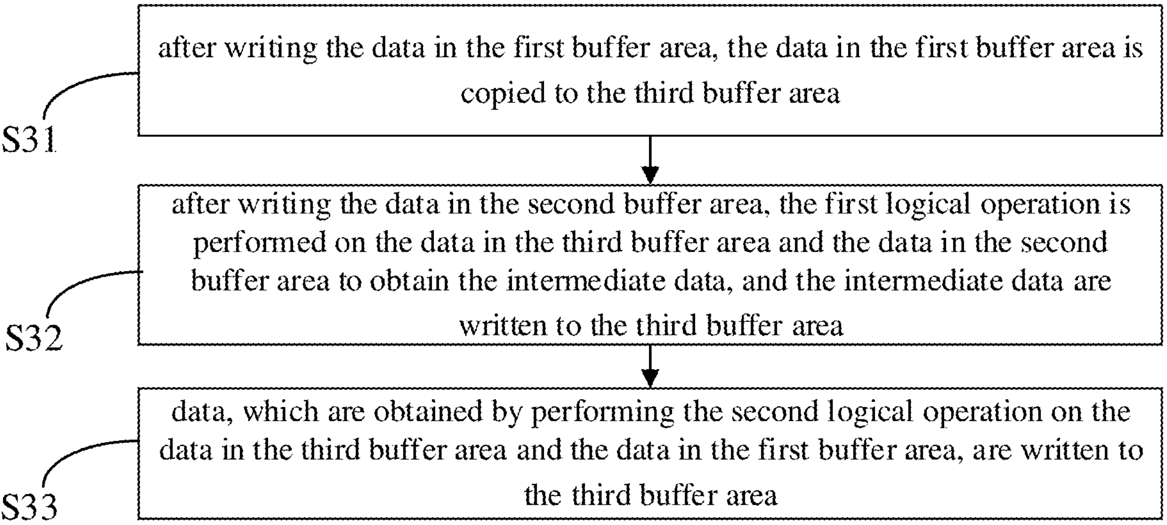
FIG. 5 is a flow chart of a data storing method according to a third embodiment of the present disclosure.

FIG. 5 is a flow chart of the data storing method according to a third embodiment of the present disclosure. The method in FIG. 5 is an extension of the above embodiment, and the method further includes following operations.

In an operation S31, after writing the data in the first buffer area, the data in the first buffer area is copied to the third buffer area.

The page buffer of the TLC memory has a three-layer page buffer configuration. Each page buffer corresponding caches one bit of data. During performing the above logical operation, when the first buffer area, which refers to the lower page buffer, stores the data of the lowest bit, the data in the first buffer area is copied and written to the third buffer area.

In an operation S32, after writing the data in the second buffer area, the first logical operation is performed on the data in the third buffer area and the data in the second buffer area to obtain the intermediate data, and the intermediate data are written to the third buffer area.

When data of a second bit are stored in the second buffer area, the logical operation is performed on the data of the first buffer area, which are now stored in the third buffer area, and the data of the second buffer area. The logical operation may be the "XNOR" operation. The intermediate data is obtained after the logical operation. Taking the intermediate data to update the data of the first buffer area, which are written in the third buffer area.

In an operation S33, data, which are obtained by performing the second logical operation on the data in the third buffer area and the data in the first buffer area, are written to the third buffer area.

After writing the intermediate data to the third buffer area, the logical operation is performed again on the data in the first buffer area and the data in the third buffer area. The logical operation may be the "OR" operation. The obtained data is the final data written to the third buffer area. The obtained data update the intermediate data and are written to the third buffer area.

After all data are written to the buffer areas, the data are written together to the memory unit.

The logical operations can be achieved by relying on the logical operation capability of the page buffer itself, without taking up any computation resource of the main control, and therefore, the computation power of the system is saved.

Figure 6:
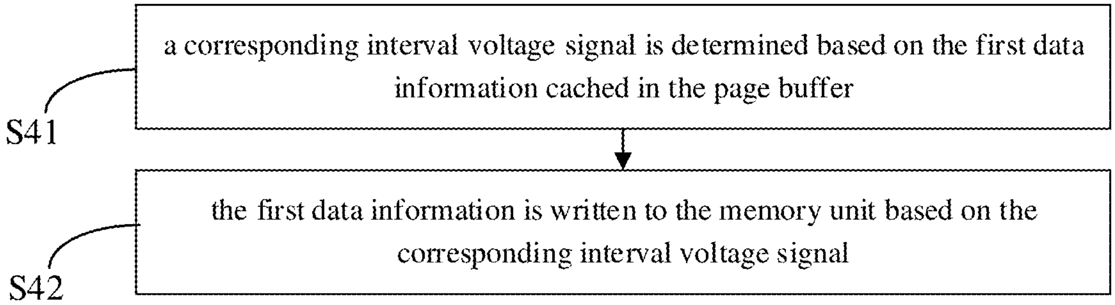
FIG. 6 is a flow chart of a data storing method according to a fourth embodiment of the present disclosure.

As shown in FIG. 6, FIG. 6 is a flow chart of the data storing method according to a fourth embodiment of the present disclosure. The method in FIG. 6 is an extension of the operation S13, and the operation S13 further includes following operations.

In an operation S41, a corresponding interval voltage signal is determined based on the first data information cached in the page buffer.

After the data of the third buffer area is obtained by performing the logical operations on the data of the first buffer area and the data of the second buffer area, data of four voltage states are obtained correspondingly. The data of four voltage states are the data information currently stored in the buffer.

In the above embodiment, the "XNOR" operation is performed on the data in the first buffer area and the data in the second buffer area to obtain the intermediate data, and the "OR" operation is performed on the intermediate data and the data in the first buffer area to obtain the data for the third buffer area. Finally, the data of four voltage states, 111, 100, 010, and 101 are obtained. According to the illustration of FIG. 1, voltage intervals corresponding to the data of the four voltage states are a first interval, a third interval, a fifth interval and an eighth interval, sequentially counted from left to right. The voltage signals corresponding to the voltage intervals are: the read level 1 corresponding to the first interval; the read level 2 and the read level 3 corresponding to the third interval; the read level 4 and the read level 5 corresponding to the fifth interval; the read level 7 corresponding to the eighth interval.

In an operation S42, the first data information is written to the memory unit based on the corresponding interval voltage signal.

After determining the cached data information, the interval voltage signal corresponding to the data information is obtained. The data are written to the memory unit based on the voltage interval signal corresponding to the data information. A writing voltage for storing the data 111 to the memory unit is less than the read level 1, or the data 111 is not written. A writing voltage for storing the data 100 to the memory unit is between the read level 2 and the read level 3. A writing voltage for storing the data 010 to the memory unit is between the read level 4 and the read level 5. A writing voltage for storing the data 101 to the memory unit is greater than the read level 7.

Figure 7:
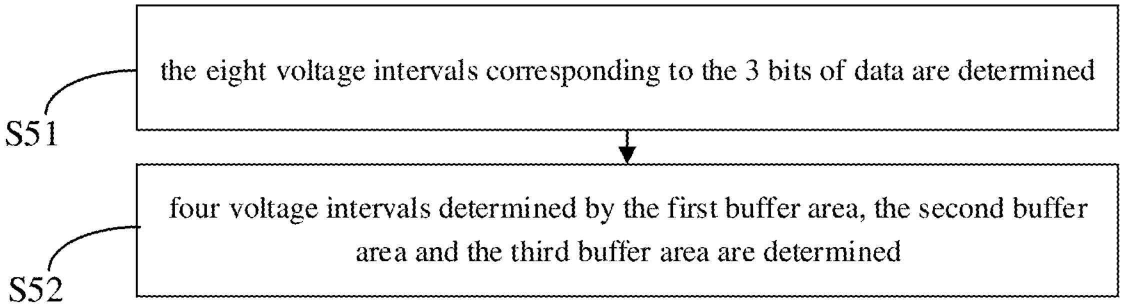
FIG. 7 is a flow chart of a data storing method according to a fifth embodiment of the present disclosure.

As shown in FIG. 7, FIG. 7 is a flow chart of the data storing method according to a fifth embodiment of the present disclosure. The method in FIG. 7 is an extension of the above embodiment, and the method further includes following operations.

In an operation S51, the eight voltage intervals corresponding to the 3 bits of data are determined.

In the storage mode of the TLC memory, one memory cell stores three bits corresponding to eight states of data. Each of the eight states of data occupies one voltage interval. In this way, the eight states of data, when being read, can be distinguished from each other based on the threshold voltage values of the voltage intervals. The eight voltage intervals are determined by seven threshold voltage values, and the seven threshold voltage values are read levels 1-7.

In an operation S52, four voltage intervals determined by the first buffer area, the second buffer area and the third buffer area are determined.

Figure 8:
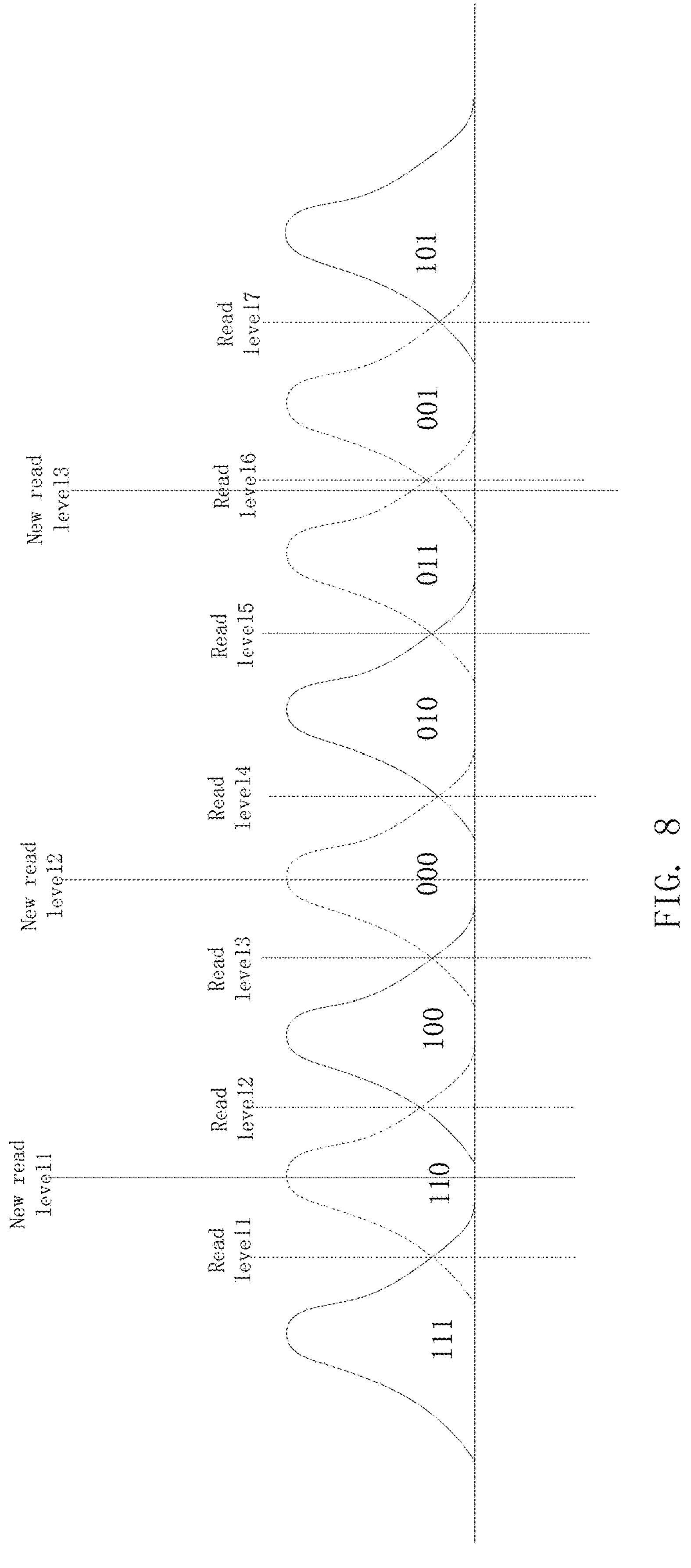
FIG. 8 is a schematic view of reading voltage intervals after performing a logical operation according to some embodiments of the present disclosure.

As shown in FIG. 8, FIG. 8 is a schematic view of reading voltage intervals after performing the logical operations according to some embodiments of the present disclosure. After performing the logical operations, four states of data out of the eight states of data are retained. For example, after the logical operations of the above embodiment, only 111, 100, 010, 101, which respectively correspond to the first voltage interval, the third voltage interval, the fifth voltage interval, and the eighth voltage interval, are retained. In order to increase reliability of the data, new reading voltages for the data need to be determined, and that is, new voltage intervals need to be divided in order to distinguish the retained four voltage states from each other. The four voltage intervals are defined by three threshold voltage values.

The three threshold voltage values are represented by using one of the seven threshold voltage values and shifts of the one of the seven threshold voltage values. After determining the voltage intervals corresponding to the retained four states of data, a threshold voltage value for each of the retained four states of data is determined. In the above embodiment, the first voltage interval, the third voltage interval, the fifth voltage interval, and the eighth voltage interval correspond to six threshold voltage values of the read level 1, the read level 2, the read level 3, the read level 4, the read level 5, and the read level 7. In order to enable reliability of each state of data to be improved effectively, a new threshold voltage value for the data 111 and the data 100 is determined as an intermediate of the first voltage interval and the third voltage interval, i.e., a middle voltage of the read level 1 and the read level 2. The middle voltage can be obtained by adding half of a difference between the read level 1 and the read level 2 on the read level 1 or by subtracting the difference between the read level 1 and the read level 2 from the read level 2. Similarly, a new threshold voltage value for the data 100 and the data 010 is determined as a middle of the third voltage interval and the fifth voltage interval, i.e., a middle voltage of the read level 3 and the read level 4. The new threshold voltage value for the data 100 and the data 010 can be obtained by adding a shift value on the read level 3 or subtracting the shift value from the read level 4. A new threshold voltage value for the data 010 and the data 101 is determined as a middle of the fifth voltage interval and the eighth voltage interval, i.e., a middle voltage of the read level 5 and the read level 7. The new threshold voltage value for the data 010 and the data 101 can be obtained by adding a shift value on the read level 5 or subtracting the shift value from the read level 7. The determined new threshold voltage value may not be an exact middle of two original threshold voltage values and can be adjusted according to the actual situations. Determining the new threshold voltage value as the exact middle of the two original threshold voltage values can maximize the reliability of each data as much as possible.

Figure 9:
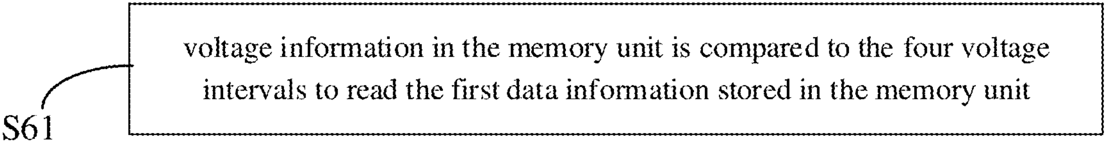
FIG. 9 is a flow chart of a data storing method according to a sixth embodiment of the present disclosure.

As shown in FIG. 9, FIG. 9 is a flow chart of the data storing method according to a sixth embodiment of the present disclosure. The method in FIG. 9 is an extension of the above embodiment, and the method further includes following operations.

In an operation S61, voltage information in the memory unit is compared to the four voltage intervals to read the first data information stored in the memory unit.

After storing the data in the buffer area in the memory unit, the data are read based on the new threshold voltage values determined from the above embodiments.

Figure 10:
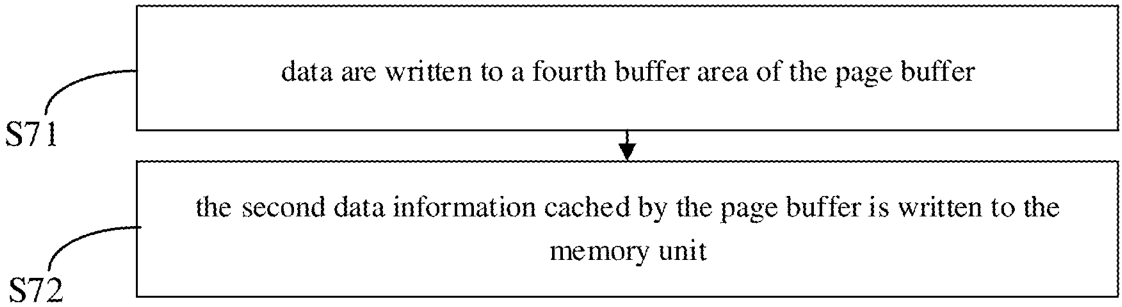
FIG. 10 is a flow chart of a data storing method according to a seventh embodiment of the present disclosure.

As shown in FIG. 10, FIG. 10 a flow chart of the data storing method according to a seventh embodiment of the present disclosure. The method in FIG. 10 is an extension of the above embodiment, and the method further includes following operations.

In an operation S71, data are written to a fourth buffer area of the page buffer.

The data written in the fourth buffer area are obtained by taking the computation resource of the page buffer to perform a logical operation on any two of the data in the first buffer area, the data in the second buffer area, and the data in the third buffer area. Second data information is determined based on the data in the first buffer area, the data in the second buffer area, the data in the third buffer area, and the data in the fourth buffer area. On the basis of the above embodiments, after writing the data to the first buffer area and the second buffer area, the data stored in the third buffer area are obtained by performing the logical operations on the data in the first buffer area and the data in the second buffer area. Furthermore, the data to be written to the fourth buffer area are obtained by performing the logical operation again on any two of the data in the first buffer area, the data in the second buffer area, and the data in the third buffer area.

In the memory cell of the QLC memory, one memory cell can store four bits of data, corresponding to sixteen voltage states and sixteen voltage intervals. The sixteen voltage intervals can be distinguished from each other by fifteen threshold voltage values. The page buffer of the QLC memory has a four-layer structure, and each page buffer corresponds to one bit of data. Writing the data starts from data of the lowest bit.

A process of performing the logical operation to obtain the data to be written to the third buffer area is referred to description of the above embodiments. For example, after writing the data in the first buffer area, the data in the first buffer area are copied to the third buffer area. After writing the data in the second buffer area, the logical operation is performed on the data in the third buffer area and the data in the second buffer area. The operation may be the "XNOR" operation. The intermediate data are obtained after the operation and are taken to update the data, which are copied from the first buffer area and are written in the third buffer area. After writing the intermediate data to the third buffer area, the logical operation is performed again on the data in the first buffer area and the intermediate data in the third buffer area. The logical operation may be the "OR" operation. The obtained data are the final data written to the third buffer area to update the intermediate data that are previously written in the third buffer area.

After the obtaining, by performing the logical operation, the data to be written to the fourth buffer area, four voltage states of data out of the original sixteen voltage states of data are retained. In order to improve reliability of the four voltage states of data, a new and larger voltage interval needs to be determined for each of the four voltage states of data. In order to improve the reliability of all the four voltage states of data, instead of only certain one of the four voltage states of data, voltage intervals originally corresponding to the four voltage states of data need to be distributed more evenly throughout the maximum voltage interval. In this way, each new voltage interval, compared to the previous voltage interval, is significantly increased. Specific determination logic can be referred to the above embodiments and will not be repeated herein The logical operations can be achieved by relying on the logical operation capability of the page buffer itself, without using any computation resource of the main control, and the computation power of the system can be saved.

In practice, each of the first buffer area, the second buffer area, the third buffer area, and the fourth buffer area is any one of all buffer areas. Locations of the first buffer area, the second buffer area, the third buffer area, and the fourth buffer area are not limited herein, terms of the first buffer area, the second buffer area, the third buffer area, and the fourth buffer area are used to indicate that the first buffer area, the second buffer area, the third buffer area, and the fourth buffer area are at different locations.

In an operation S72, the second data information cached by the page buffer is written to the memory unit.

After writing the data to the buffer is completed, the cached second data information is written to the memory unit. The second data information is determined from the data written in the first buffer area, the data written in the second buffer area, the data written in the third buffer area, and the data written in the fourth buffer area, where the first buffer area, the second buffer area, the third buffer area, and the fourth buffer area correspond to a same voltage interval. After the data are written to the memory unit, storing the data is completed.

Figure 11:
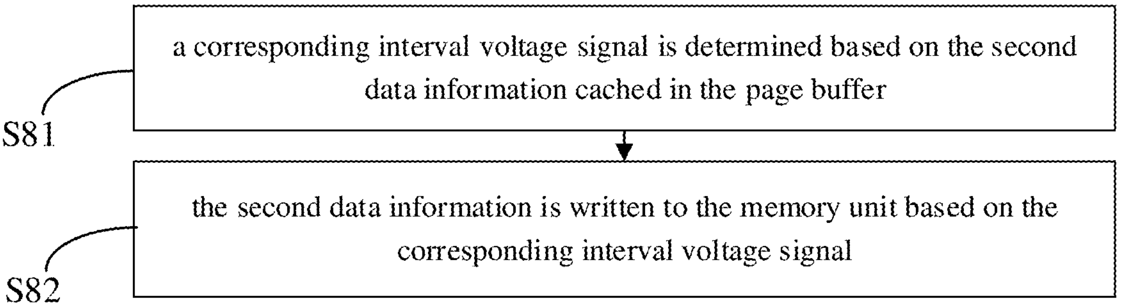
FIG. 11 is a flow chart of a data storing method according to an eighth embodiment of the present disclosure.

As shown in FIG. 11, FIG. 11 is a flow chart of the data storing method according to an eighth embodiment of the present disclosure. The method in FIG. 11 is an extension of the operation S72, and the operation S72 further includes following operations.

In an operation S81, a corresponding interval voltage signal is determined based on the second data information cached in the page buffer.

After performing the logical operation on the data in the first buffer area and the data in the second buffer area to obtain the data in the third buffer area and performing the logical operation again to obtain the data in the fourth buffer area, four voltage states of data are obtained correspondingly. The four voltage states of data are the data information currently stored in the buffer.

After determining the four voltage states of data, original voltage intervals and threshold voltage values of the original voltage intervals corresponding to the four voltage states of data can be determined. Operations of the determining can be referred to the above embodiment and will not be repeated herein.

In an operation S82, the second data information is written to the memory unit based on the corresponding interval voltage signal.

A voltage interval and a threshold voltage value of the voltage interval are determined based on the determined data in the buffer. The data are written to the memory unit based on the interval voltage. A voltage at which the corresponding data information is written to the memory unit is within a corresponding voltage interval. Specific operations may be referred to the description of the operation S42 of the above embodiment and will not be repeated herein.

Figure 12:
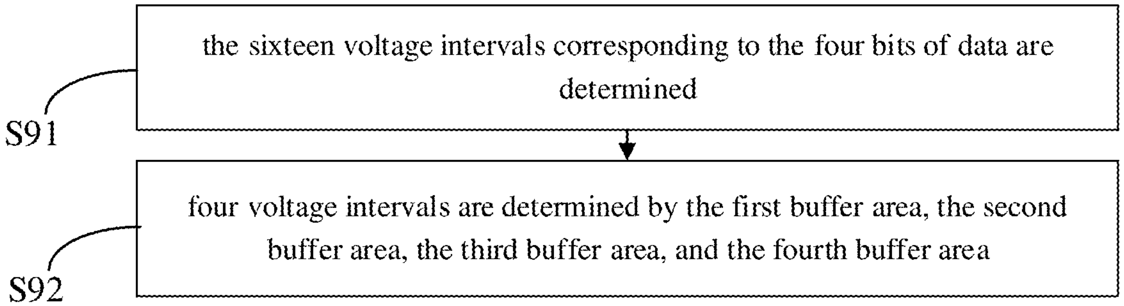
FIG. 12 is a flow chart of a data storing method according to a ninth embodiment of the present disclosure.

As shown in FIG. 12, FIG. 12 a flow chart of the data storing method according to a ninth embodiment of the present disclosure. The method in FIG. 12 is an extension of the above embodiment, and the method further includes following operations.

In an operation S91, the sixteen voltage intervals corresponding to the four bits of data are determined.

In the storage mode of the QLC memory, one memory cell stores 4 bits, corresponding to sixteen states of data, and each of the sixteen states of data occupies one voltage interval, such that the sixteen states of data, when being read, can be distinguished from each other based on the threshold voltage values. The sixteen voltage intervals are determined by fifteen threshold voltage values, and the fifteen threshold voltage values are read levels 1-15.

In an operation S92, four voltage intervals are determined by the first buffer area, the second buffer area, the third buffer area, and the fourth buffer area.

After the logical operations, only four states of data of the sixteen states of data are retained. For example, in a case, after the logical operations, the retained four states of data respectively correspond to the first voltage interval, the fifth voltage interval, the tenth voltage interval, and the sixteenth voltage interval. In order to increase the reliability of the data, a new reading voltage needs to be determined for each state of the four states of data, and that is, new voltage intervals need to be divided to distinguish the four voltage states from each other. The four voltage intervals are determined by three threshold voltage values.

The three threshold voltage values are represented by using one of the fifteen threshold voltage values and shifts of the one of the fifteen threshold voltage values. After determining the voltage intervals corresponding to the retained four states of data, a threshold voltage value for each of the retained four states of data is determined. In a case, the first voltage interval, the fifth voltage interval, the tenth voltage interval, and the sixteenth voltage interval are retained and correspond to six threshold voltage values of the read level 1, the read level 4, the read level 5, the read level 9, the read level 10, and the read level 15. In order to enable reliability of each state of data to be improved effectively, a first new threshold voltage value is determined as an intermediate of the first voltage interval and the fifth voltage interval, i.e., a middle voltage of the read level 1 and the read level 4. The middle voltage can be obtained by adding half of a difference between the read level 1 and the read level 4 on the read level 1 or by subtracting the difference between the read level 1 and the read level 4 from the read level 4. Similarly, a second new threshold voltage value is determined as a middle of the fifth voltage interval and the tenth voltage interval, i.e., a middle voltage of the read level 5 and the read level 9. The second new threshold voltage value can be obtained by adding a shift value on the read level 5 or subtracting the shift value from the read level 9. A third new threshold voltage value is determined as a middle of the tenth voltage interval and the sixteenth voltage interval, i.e., a middle voltage of the read level 10 and the read level 15. The third new threshold voltage value can be obtained by adding a shift value on the read level 10 or subtracting the shift value from the read level 15. The determined new threshold voltage value may not be an exact middle of two original threshold voltage values and can be adjusted according to the actual situations. Determining the new threshold voltage value as the exact middle of the two original threshold voltage values can maximize the reliability of each data as much as possible.

Figure 13:
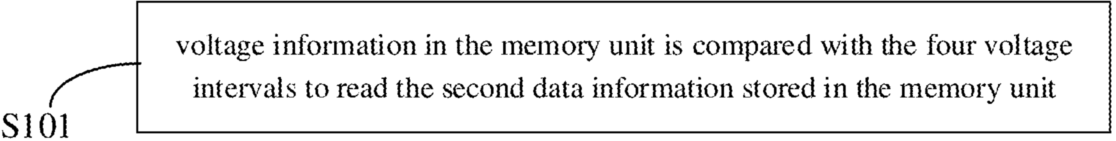
FIG. 13 is a flow chart of a data storing method according to a tenth embodiment of the present disclosure.

As shown in FIG. 13, FIG. 13 is a flow chart of the data storing method according to a tenth embodiment of the present disclosure. The method in FIG. 13 is an extension of the above embodiment, and the method further includes following operations.

In an operation S101, voltage information in the memory unit is compared with the four voltage intervals to read the second data information stored in the memory unit.

After storing the data in the buffer area to the memory unit, the data are read based on the new threshold voltage values determined above.

According to the above-described embodiments, it can be reached out that, in the memory unit of the QLC memory, the data are written to the first buffer area, the second buffer area, and the third buffer area based on original threshold voltage values. Furthermore, eight voltage states of data are obtained by performing logical operations, such that the eight voltage states of data are uniformly distributed throughout the maximum voltage interval. Further, based on the original voltage intervals and the threshold voltage values corresponding to the eight voltage states of data, new eight voltage intervals and corresponding seven threshold voltage values are determined. The new seven threshold voltage values may be obtained based on threshold voltage values corresponding to the eight voltage states of data. After storing the data information stored in the buffer to the memory unit, the memory unit is read based on the new seven threshold voltage values. The method of the present embodiment is also within the scope of the present disclosure.

Figure 14:
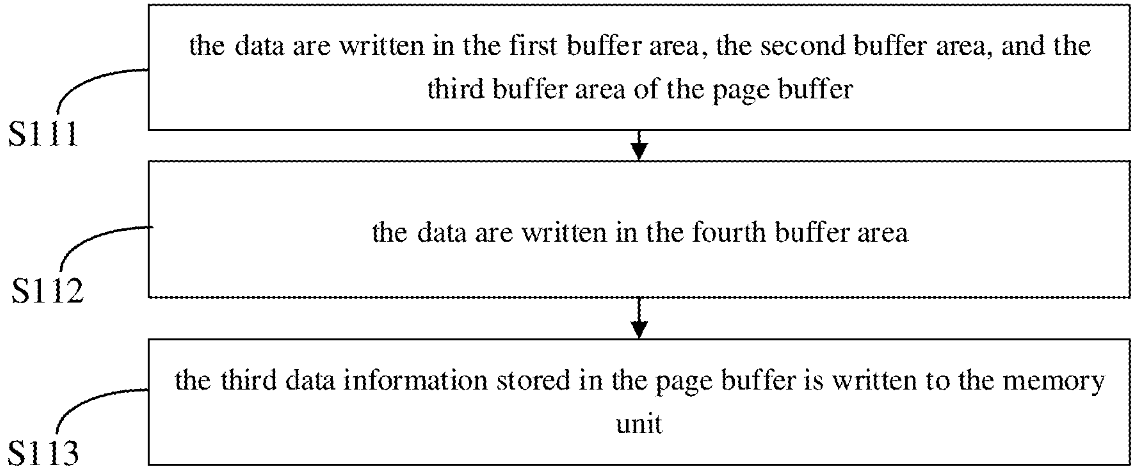
FIG. 14 is a flow chart of a data storing method according to an eleventh embodiment of the present disclosure.

As shown in FIG. 14, FIG. 14 a flow chart of the data storing method according to an eleventh embodiment of the present disclosure.

In an operation S111, the data are written in the first buffer area, the second buffer area, and the third buffer area of the page buffer.

In the memory unit of the QLC memory, the data are written to the first buffer area, the second buffer area, and the third buffer area in accordance with an original storing and writing process and in accordance with original read level voltage values.

In an operation S112, the data are written in the fourth buffer area.

The data written in the fourth buffer area are obtained by taking the computation resource of the page buffer to perform the logical operation on any two of the data in the first buffer area, the data in the second buffer area, and the data in the third buffer area. Third data information is determined based on the data in the first buffer area, the data in the second buffer area, and the data in the third buffer area.

In an operation S113, the third data information stored in the page buffer is written to the memory unit.

After writing the data in the buffer is completed, the finally obtained data are written to the memory unit, such that storing the data is completed.

In practical, each of the first buffer area, the second buffer area, the third buffer area, and the fourth buffer area is any one of all buffer areas. Locations of the first buffer area, the second buffer area, the third buffer area, and the fourth buffer area are not limited herein, terms of the first buffer area, the second buffer area, the third buffer area, and the fourth buffer area are used to indicate that the first buffer area, the second buffer area, the third buffer area, and the fourth buffer area are at different locations.

Figure 15:
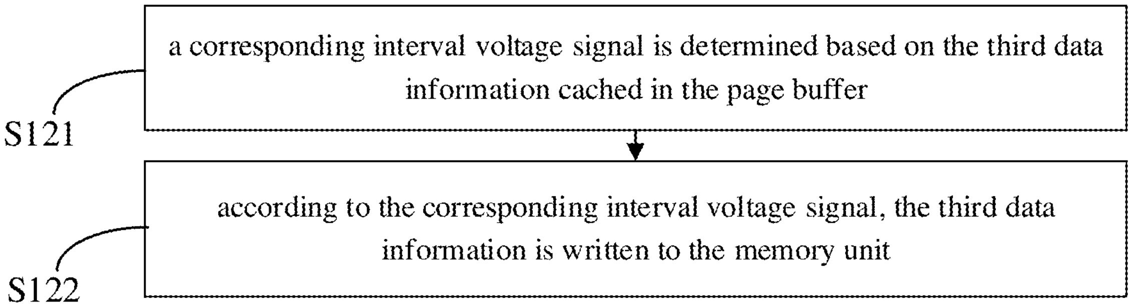
FIG. 15 is a flow chart of a data storing method according to a twelfth embodiment of the present disclosure.

As shown in FIG. 15, FIG. 15 is a flow chart of the data storing method according to a twelfth embodiment of the present disclosure. The method in FIG. 15 is an extension of the operation S113, and the operation S113 further includes following operations.

In an operation S121, a corresponding interval voltage signal is determined based on the third data information cached in the page buffer.

After writing the data in the first buffer area, the second buffer area, and the third buffer area, the data to be written to the fourth buffer area are obtained by taking the computation resource of the page buffer to perform the logical operation, such that the eight voltage states of data are finally obtain and are the data information that can be stored in the buffer.

After determining the eight voltage states of data, original voltage intervals and threshold voltage values of the original voltage intervals corresponding to the eight voltage states are determined. Operations of the determining are referred to the above embodiment and will not be repeated herein.

In an operation S122, according to the corresponding interval voltage signal, the third data information is written to the memory unit.

The voltage interval and the threshold voltage value of the voltage interval are determined based on the determined cached data. The data are written to the memory unit based on the interval voltage. The voltage at which the corresponding data information is written to the memory unit is within the corresponding voltage interval. Details of the operation are referred to the above embodiments and will not be repeated herein.

As shown in FIG. 16, FIG. 16 is a flow chart of the data storing method according to a thirteenth embodiment of the present disclosure. The method in FIG. 16 is an extension of the above embodiment, and the method further includes following operations.

In an operation S131, the sixteen voltage intervals corresponding to the four bits of data are determined.

In the storage mode of the QLC memory, one memory cell stores four bits, corresponding to sixteen states of data, each of the sixteen states of data occupies one voltage interval, such that the sixteen states of data, when being read, can be distinguished from each other based on the threshold voltage values. The sixteen voltage intervals are determined by fifteen threshold voltage values, and the fifteen threshold voltage values are read levels 1-15.

In an operation S132, the eight voltage intervals are determined by the first buffer area, the second buffer area, the third buffer area, and the fourth buffer area.

After the logical operations, only eight states of data of the sixteen states of data are retained. For example, in a case, after the logical operations, the retained eight states of data respectively correspond to the first voltage interval, the third voltage interval, the fifth voltage interval, the seventh voltage interval, the ninth voltage interval, the eleventh voltage interval, the thirteenth voltage interval, and the sixteenth voltage interval.

In order to increase the reliability of the data, a new reading voltage needs to be determined for each state of the eight states of data, and that is, new voltage intervals need to be divided to distinguish the eight voltage states from each other. The eight voltage intervals are determined by seven threshold voltage values.

The seventh threshold voltage values are represented by using one of the fifteen threshold voltage values and shifts of the one of the fifteen threshold voltage values. After determining the voltage intervals corresponding to the retained eight states of data, a threshold voltage value for each of the retained eight states of data is determined. In a case, the first voltage interval, the third voltage interval, and the fifth voltage interval are included in all the retained voltage intervals. Threshold voltage values corresponding to the third voltage interval are the read level 2 and the read level 3. The threshold voltage value corresponding to the first voltage interval are the read level 1. Threshold voltage values corresponding to the fifth voltage interval are the read level 4 and the read level 5. In this case, a first new threshold voltage value is determined as an intermediate of the first voltage interval and the third voltage interval, i.e., a middle voltage of the read level 1 and the read level 2. The first new threshold voltage can be obtained by adding half of a difference between the read level 1 and the read level 2 on the read level 1 or by subtracting the difference between the read level 1 and the read level 2 from the read level 2. The other new threshold voltage values may be determined by following the above description. The determined new threshold voltage value may not be an exact middle of two original threshold voltage values and can be adjusted according to the actual situations. Determining the new threshold voltage value as the exact middle of the two original threshold voltage values can maximize the reliability of each data as much as possible.

As shown in FIG. 17, FIG. 17 is a flow chart of the data storing method according to a fourteenth embodiment of the present disclosure. The method in FIG. 17 is an extension of the above embodiment, and the method further includes following operations.

In an operation S141, voltage information in the memory unit is compared with the eight voltage intervals to read the third data information stored in the memory unit.

After storing the data in the buffer area to the memory unit, the data are read based on the new eight threshold voltage values determined above.

On the basis of the above embodiments, for a storage device that can store a plurality of bits of information in one memory unit, any technical solution in which the bits of information stored in one memory unit is decreased by performing the above-described logical operations in the page buffer, however, the data reliability is improved, shall be covered within the scope of the present disclosure.

As shown in FIG. 18, FIG. 18 is a structural schematic view of the storage device according to some embodiments of the present disclosure.

The storage device includes a processor 110 and a memory 120.

The processor 110 controls operations of the storage device, and the processor 110 may also be referred to as a Central Processing Unit (CPU). The processor 110 may be an integrated circuit chip having a signal sequence processing capability. Processor 110 may also be a general-purpose processor, a digital signal sequence processor (DSP), an application-specific integrated circuit (ASIC), a field programmable gate array (FPGA) or other programmable logic devices, a discrete gate or transistor logic device, a discrete hardware component. The general-purpose processor may be a microprocessor or the processor may also be any conventional processor and so on.

The memory 120 stores instructions and program data necessary for the processor 110 to operate.

The processor 110 is configured to execute the instructions to implement the method provided by any of the embodiments and potential combinations of the data storing methods described in the present disclosure.

The storage device described in the above may be a TLC/QLC NAND FLASH memory.

As shown in FIG. 19, FIG. 19 is a structural schematic view of a computer-readable storage device according to some embodiments of the present disclosure.

In an embodiment, the computer-readable storage device includes a memory 210, the memory 210 stores program data. The program data, when being executed, implement the method provided in any of the embodiments and potential combinations of the data storing method of the present disclosure.

The memory 210 may include a medium, such as a USB flash drive, a portable hard drive, a read-only memory (ROM), a random access memory (RAM), a magnetic disk, and so on, that can store the program instructions; or may be a server storing the program instructions. The server may send the stored program instructions to other devices for execution or may run the stored program instructions on its own.

In summary, in the present disclosure, based on determining the data in the first buffer area and the second buffer area, instead of determining the data in the third buffer area based on the threshold voltage value, the data in the third buffer area are determined by performing the logical operations on the data in the first buffer area and the data in the second buffer area. The cached data has two states, namely 0 or 1, and one bit of data information is stored in one buffer area. Therefore, when the data in the first buffer area, the data in the second buffer area, and the data in the third buffer area are determined based on the method in the art, eight types of data information are obtained. In the present disclosure, the data in the third buffer area are obtained by performing the logical operations on the data in the first buffer area and in the second buffer area, and therefore, the data in the third buffer area correspond to the four states of data in the first the buffer area and the second buffer area. In this way, the data information finally obtained based on the data in the first buffer area, the data in the second buffer area, and the data in the third buffer area has only four states instead of eight states in the art. Since the states of the data information are reduced, within the same maximum voltage interval, a larger voltage interval is divided for each of the four states of data, tolerance for data voltage shifting is improved, and reliability of the stored data is improved. Further, the logical operations can be achieved by applying logical operation functions in the page buffer, and the computation resource of an upper layer is not needed, the computation power of the system is saved.

In various embodiments in the present disclosure, it should be understood that the disclosed methods and the device can be achieved in other ways. For example, the device in the above-described implementations is merely schematic, for example, division of the modules or units is performed based on logical functions. In practice, the modules can be divided in other ways, for example, multiple units or components may be combined or may be integrated into another system, or some features may be omitted or not implemented.

Units illustrated as being separated from each other may be or may not be physically separated from each other. A component displayed as a unit may be or may not be a physical unit. That is, the component may be located at one place or may be distributed to a plurality of network units. Some or all of the units may be selected, according to actual needs, to achieve the purpose of the present disclosure.

In addition, functional units in various embodiments of the present disclosure may be integrated in one processing unit, or may be physically present separately from each other; or two or more units may be integrated in one unit. The above integrated units may be achieved either in the form of hardware or in the form of software functional units.

The units integrated in the above embodiments may be stored in a computer-readable storage medium when implemented as a software functional unit and sold or used as a stand-alone product. Based on this understanding, a portion of the technical solution of the present disclosure that has a contribution to the art, or an entirety or a part of the technical solution, may be achieved in the form of a software product, which is stored in a storage medium and includes a number of instructions to enabling a computer device (which may be a personal computer, a server, or a network device, and so on) or a processor to perform the functions of the various embodiments of the present disclosure. The aforementioned storage medium includes: a USB flash drive, a portable hard drive, a read-only memories (ROM), a random access memory (RAM), a magnetic disk, or a CD-ROM, and other media that can store program codes.

The above describes only examples of the present disclosure, and is not intended to limit the scope of the present disclosure. Any equivalent structure or equivalent process transformation performed based on the contents of the specification and the accompanying drawings of the present disclosure, applied directly or indirectly in other related technical fields, are all similarly included in the scope of the present disclosure.

What is claimed is:

1. A method of storing data, comprising:

writing first data in a first buffer area and writing second data in a second buffer area of a page buffer;

writing third data in a third buffer area of the page buffer, wherein the third data written in the third buffer area are obtained by taking a computation resource of the page buffer to perform a logical operation on the first data in the first buffer area and the second data in the second buffer area; first data information is determined based on the first data in the first buffer area, the second data in the second buffer area, and the third data in the third buffer area; the first data information is data of all voltage states for the first data written in the first buffer area, the second data written in the second buffer area, and the third data written in the third buffer area; wherein, the first buffer area, the second buffer area, and the third buffer area correspond to one same voltage interval; and writing the first data information to one memory unit.

2. The method according to claim 1, wherein the writing third data in a third buffer area of the page buffer, comprises:

performing a first logical operation on the first data in the first buffer area and the second data in the second buffer area to obtain intermediate data;

writing data, which are obtained by performing a second logical operation on the intermediate data and the first data in the first buffer area, to the third buffer area;

or writing data, which are obtained by performing a second logical operation on the intermediate data and the second data in the second buffer area, to the third buffer area.

3. The method according to claim 2, wherein the performing a first logical operation on the first data in the first buffer area and the second data in the second buffer area to obtain intermediate data, comprises:

after writing the first data in the first buffer area, copying the first data in the first buffer area to the third buffer area;

after writing the second data to the second buffer area, performing the first logical operation on the first data in the third buffer area and the second data in the second buffer area to obtain the intermediate data, and writing the intermediate data to the third buffer area;

wherein the writing data, which are obtained by performing a second logical operation on the intermediate data and the first data in the first buffer area, to the third buffer area, comprises:

writing the data, which are obtained by performing the second logical operation on the data in the third buffer area and the first data in the first buffer area, to the third buffer area.

4. The method according to claim 2, wherein the first logical operation is an XNOR operation, and the second logical operation is an OR operation.

5. The method according to claim 1, wherein the writing the first data information cached in the page buffer to a memory unit, comprises:

determining a corresponding first interval voltage signal based on the first data information cached in the page buffer; and writing the first data information to the memory unit based on the corresponding first interval voltage signal.

6. The method according to claim 5, wherein the method further comprises:

determining eight voltage intervals corresponding to three bits of data, the eight voltage intervals being determined by seven threshold voltage values; and determining four voltage intervals determined by the first buffer area, the second buffer area and the third buffer area; the four voltage intervals being determined by three threshold voltage values;

wherein one of the seven threshold voltage values and shifts corresponding to the one of the seven threshold voltage values are used to represent the three threshold voltage values.

7. The method according to claim 6, wherein the method further comprises:

comparing voltage information in the memory cell with the four voltage intervals to read the first data information stored in the memory cell.

8. The method according to claim 1, wherein the method further comprises:

writing fourth data in a fourth buffer area of the page buffer, wherein the fourth data written in the fourth buffer area are obtained by taking the computation resource of the page buffer to perform a logical operation on any two of the first data in the first buffer area, the second data in the second buffer area, and the third data in the third buffer area; second data information is obtained based on the first data in the first buffer area, the second data in the second buffer area, the third data in the third buffer area, and the fourth data in the fourth buffer area; and writing the second data information cached in the page buffer to the memory unit.

9. The method according to claim 8, wherein the writing the second data information cached in the page buffer to the memory unit, comprises:

determining a corresponding second interval voltage signal based on the second data information cached in the page buffer;

writing the second data information to the memory unit based on the corresponding second interval voltage signal.

10. The method according to claim 9, wherein the method further comprises:

determining sixteen voltage intervals corresponding to four bits of data, the sixteen voltage intervals being determined by fifteen threshold voltage values; and determining four voltage intervals determined by the first buffer area, the second buffer area, the third buffer area, and the fourth buffer area; the four voltage intervals being determined by three threshold voltage values;

wherein one of the fifteen threshold voltage values and shifts corresponding to the one of the fifteen threshold voltage values are used to represent the three threshold voltage values.

11. The method according to claim 10, wherein the method further comprises:

comparing voltage information in the memory cell with the four voltage intervals to read the second data information stored in the memory cell.

12. The method according to claim 1, wherein, after writing the first data in the first buffer area and writing the second data in the second buffer area of the page buffer, the method further comprises:

writing the third data in the third buffer area of the page buffer;

writing fourth data in a fourth buffer area, wherein the fourth data written in the fourth buffer area are obtained by taking the computation resource of the page buffer to perform a logical operation on any two of the first data in the first buffer area, the second data in the second buffer area, and the third data in the third buffer area; third data information is determined based on the first data in the first buffer area, the second data in the second buffer area, the third data in the third buffer area, and the fourth data in the fourth buffer area; and writing the third data information stored in the page buffer to the memory unit.

13. The method according to claim 12, wherein the writing the third data information stored in the page buffer to the memory unit, comprises:

determining a corresponding third interval voltage signal based on the third data information cached in the page buffer; and writing the third data information to the memory unit based on the corresponding third interval voltage signal.

14. The method according to claim 13, wherein the method further comprises:

determining sixteen voltage intervals corresponding to four bits of data, the sixteen voltage intervals being determined by fifteen threshold voltage values; and determining eight voltage intervals determined by the first buffer area, the second buffer area, the third buffer area, and the fourth buffer area; the eight voltage intervals being determined by seven threshold voltage values;

wherein one of the fifteen threshold voltage values and shifts corresponding to the one of the fifteen threshold voltage values are used to represent the eight threshold voltage values.

15. The method according to claim 14, wherein the method further comprises:

comparing voltage information in the memory cell with the eight voltage intervals to read the third data information stored in the memory cell.

16. A storage device, comprising: a memory and a processor, wherein the memory is configured to store program data, the program data being capable of being executed by the processor to perform a method of storing data, wherein the method comprises:

writing first data in a first buffer area and writing second data in a second buffer area of a page buffer;

writing third data in a third buffer area of the page buffer, wherein the third data written in the third buffer area are obtained by taking a computation resource of the page buffer to perform a logical operation on the first data in the first buffer area and the second data in the second buffer area; first data information is determined based on the first data in the first buffer area, the second data in the second buffer area, and the third data in the third buffer area; the first data information is data of all voltage states for the first data written in the first buffer area, the second data written in the second buffer area, and the third data written in the third buffer area; wherein, the first buffer area, the second buffer area, and the third buffer area correspond to one same voltage interval; and writing the first data information to one memory unit.

17. The storage device according to claim 16, wherein the storage device is a TLC/QLC NAND FLASH memory.

18. A computer-readable storage device, wherein program data are stored therein, the program data being capable of being executed by a processor to perform a method of storing data, wherein the method comprises:

writing first data in a first buffer area and writing second data in a second buffer area of a page buffer;

writing third data in a third buffer area of the page buffer, wherein the third data written in the third buffer area are obtained by taking a computation resource of the page buffer to perform a logical operation on the first data in the first buffer area and the second data in the second buffer area; first data information is determined based on the first data in the first buffer area, the second data in the second buffer area, and the third data in the third buffer area; the first data information is data of all voltage states for the first data written in the first buffer area, the second data written in the second buffer area, and the third data written in the third buffer area; wherein, the first buffer area, the second buffer area, and the third buffer area correspond to one same voltage interval; and writing the first data information to one memory unit.

19. The computer-readable storage device according to claim 18, wherein the writing third data in a third buffer area of the page buffer, comprises:

performing a first logical operation on the first data in the first buffer area and the second data in the second buffer area to obtain intermediate data;

writing data, which are obtained by performing a second logical operation on the intermediate data and the first data in the first buffer area, to the third buffer area;

or writing data, which are obtained by performing a second logical operation on the intermediate data and the second data in the second buffer area, to the third buffer area.

20. The computer-readable storage device according to claim 19, wherein the performing a first logical operation on the first data in the first buffer area and the second data in the second buffer area to obtain intermediate data, comprises:

after writing the first data in the first buffer area, copying the first data in the first buffer area to the third buffer area;

after writing the second data to the second buffer area, performing the first logical operation on the first data in the third buffer area and the second data in the second buffer area to obtain the intermediate data, and writing the intermediate data to the third buffer area;

wherein the writing data, which are obtained by performing a second logical operation on the intermediate data and the first data in the first buffer area, to the third buffer area, comprises:

writing the data, which are obtained by performing the second logical operation on the data in the third buffer area and the first data in the first buffer area, to the third buffer area.

* * * * *